US008145862B2

(12) United States Patent
Ehresmann et al.

(10) Patent No.: US 8,145,862 B2
(45) Date of Patent: Mar. 27, 2012

(54) ARRANGEMENT FOR EXCHANGE OF CUSTOMER DATA OF A FRANKING MACHINE

(75) Inventors: Rainer Ehresmann, Berlin (DE); Christoph Kunde, Berlin (DE); Thomas Kux, Berlin (DE); Torsten Schlaaff, Zepernick (DE); Sabine Roth, Berlin (DE)

(73) Assignee: Francotyp-Postalia GmbH, Birkenwerder (DE)

( * ) Notice: Subject to any disclaimer, the term of this patent is extended or adjusted under 35 U.S.C. 154(b) by 892 days.

(21) Appl. No.: 11/959,597

(22) Filed: Dec. 19, 2007

(65) Prior Publication Data

US 2008/0126670 A1 May 29, 2008

Related U.S. Application Data

(63) Continuation-in-part of application No. 11/754,612, filed on May 29, 2007, now abandoned.

(30) Foreign Application Priority Data

May 31, 2006 (DE) ..................... 20 2006 008 952 U

(51) Int. Cl.
*G06F 12/14* (2006.01)
*G06F 12/16* (2006.01)

(52) U.S. Cl. .................. 711/162; 711/E12.103; 705/60; 705/405

(58) Field of Classification Search .................. 711/103, 711/162, E12.092, E12.103; 705/60, 401, 705/405

See application file for complete search history.

(56) References Cited

U.S. PATENT DOCUMENTS

| | | | | |
|---|---|---|---|---|
| 5,111,030 | A | 5/1992 | Brasington et al. | |
| 5,307,280 | A * | 4/1994 | Haug | 705/405 |
| 5,509,117 | A | 4/1996 | Haug | |
| 5,892,216 | A * | 4/1999 | Grant et al. | 235/492 |
| 6,061,671 | A * | 5/2000 | Baker et al. | 705/404 |
| 6,085,180 | A | 7/2000 | Beer et al. | |
| 6,453,369 | B1 * | 9/2002 | Imamura et al. | 710/36 |
| 6,853,990 | B1 * | 2/2005 | Thiel | 705/401 |
| 7,133,849 | B1 | 11/2006 | Thiel | |
| 7,769,700 | B1 * | 8/2010 | D'Amico et al. | 705/401 |
| 2002/0016780 | A1 * | 2/2002 | Shah | 705/410 |
| 2002/0053008 | A1 * | 5/2002 | Goodman et al. | 711/162 |
| 2002/0073349 | A1 | 6/2002 | Turner et al. | |
| 2002/0194017 | A1 * | 12/2002 | Post et al. | 705/1 |
| 2003/0014660 | A1 * | 1/2003 | Verplaetse et al. | 713/200 |
| 2003/0041188 | A1 * | 2/2003 | Han et al. | 710/11 |
| 2004/0116155 | A1 * | 6/2004 | Aisenberg | 455/558 |
| 2005/0137988 | A1 * | 6/2005 | Harris et al. | 705/401 |
| 2005/0149476 | A1 * | 7/2005 | Griffin et al. | 707/1 |
| 2005/0223268 | A1 * | 10/2005 | Tchen et al. | 714/6 |
| 2008/0010211 | A1 * | 1/2008 | Ferraro | 705/60 |
| 2008/0162597 | A1 * | 7/2008 | Tysowski et al. | 707/204 |

* cited by examiner

*Primary Examiner* — Edward Dudek, Jr.
*Assistant Examiner* — Hal Schnee
(74) *Attorney, Agent, or Firm* — Schiff Hardin LLP

(57) ABSTRACT

In a method and an apparatus for exchanging customer data of a franking machine, a data processing device is in communication with a first memory that is permanently connected therewith, and is also in communication with a security module for implementing security-relevant services associated with franking. The data processor stores user data in the first memory that are predetermined by a user. A second memory is connected to the data processor in a manner allowing the second memory to be readily detached. The data processor stores the user data in the second memory for data backup.

13 Claims, 6 Drawing Sheets

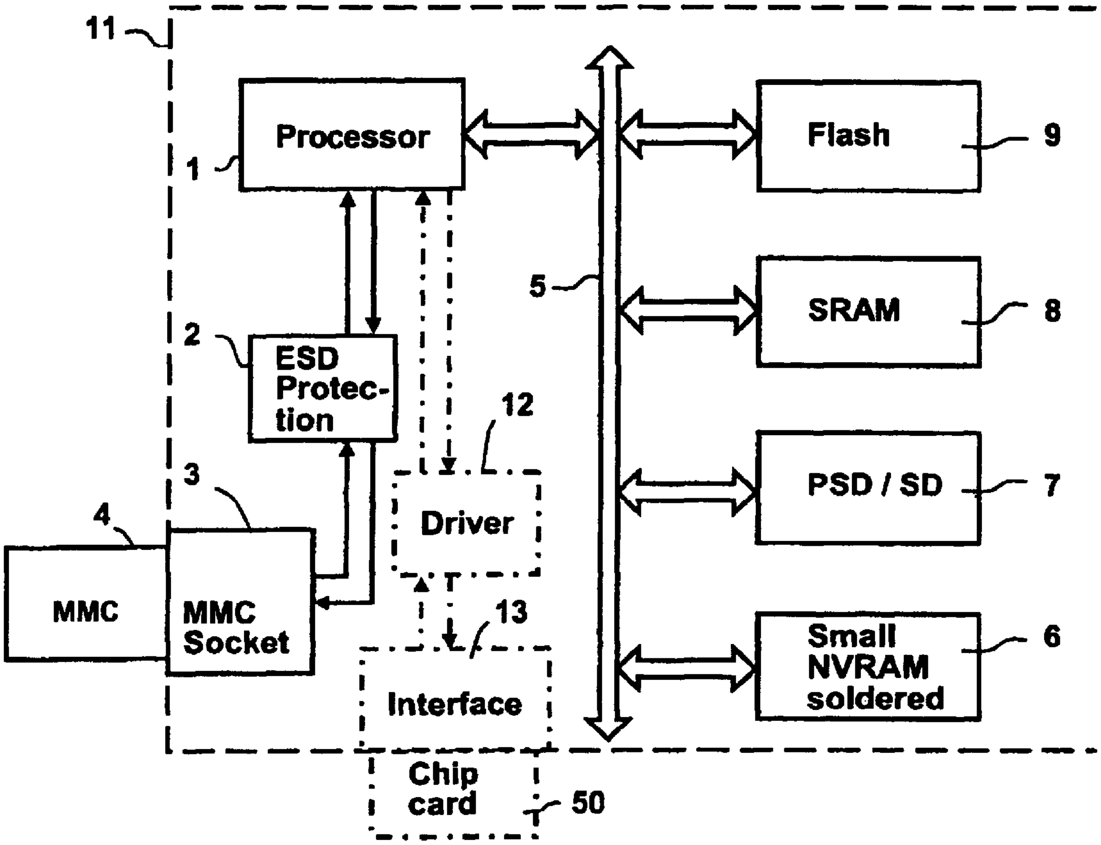
Fig. 3
Fig. 4
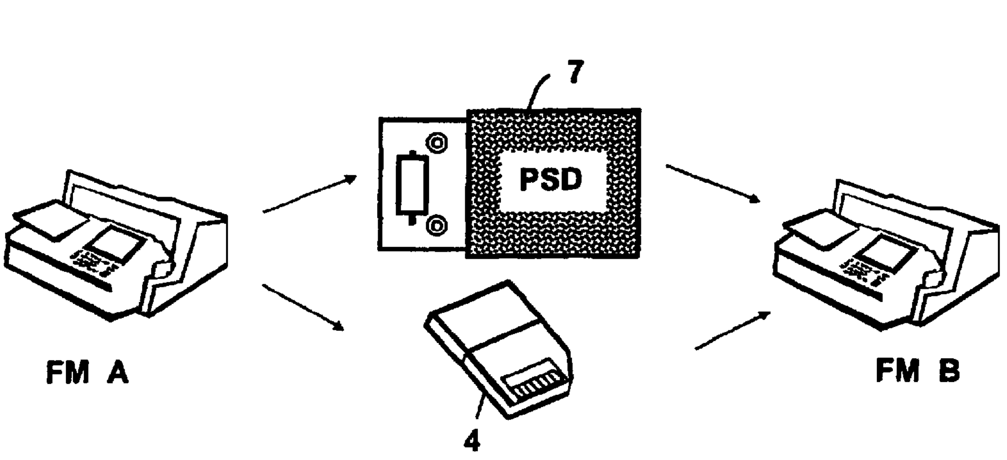

ARRANGEMENT FOR EXCHANGE OF CUSTOMER DATA OF A FRANKING MACHINE

CONTINUING APPLICATION INFORMATION

The present application is a continuation-in-part of U.S. application Ser. No. 11/754,612, filed May 29, 2007 now abandoned.

BACKGROUND OF THE INVENTION

1. Field of the Invention

The invention concerns an arrangement for data processing, in particular for a franking machine, with: a data processing device; a memory permanently connected with the data processing device; and a security module connected with the data processing device for implementation of security-relevant services; whereby the data processing device is fashioned to store user data predeterminable by a user of the arrangement in the memory. It furthermore concerns a corresponding method for operation of such an arrangement for data processing.

2. Description of the Prior Art

A series of such arrangements for data processing are known in which a security module executes security-relevant services. Such security-relevant services can be any services in which a legal or economic interest exists that no undetected manipulations occur in their execution. Such services are frequently billing-relevant services whose execution is directly or indirectly connected with a payment of a specific monetary amount. This is the case, for example, in the franking of mail pieces, given which a franking imprint with monetary value is applied on the mail piece, which monetary value is in turn billed via a corresponding billing service of the security module.

In such arrangements for data processing that are used, for example, in the framework of a franking machine, the security-relevant data (thus, for example, the data that are required for execution of the security-relevant service or that result from the execution of the security-relevant service (frequently also designated as postal data) cannot be provided by the user of the arrangement for security reasons. However, normally it is possible for the user to personally freely provide specific settings of the arrangement and data stored in the arrangement (possibly within certain limits). Such data should be designated as user data or customer-dependent data in the following.

The user data or customer-dependent data (such as, for example, cliché and cost center data of a franking device) stored in a non-volatile manner in a memory of each franking device and must be rescued from a data loss in the event of repair. A franking machine or a personal computer that is operated as a PC franker and a commercially available printer are in particular controlled as a franking device.

A postal fee billing system is known from German Published Application DE 39 03 718 A1 (corresponding to U.S. Pat. No. 5,111,030). Franking machine usage information is written to a chip card or read out therefrom. A transfer of data stored in first hardware to second hardware is, however, not possible in the case of defective hardware.

A method and apparatus for monitored controlled downloading of graphical images from a portable apparatus into a franking machine system is known from U.S. Pat. No. 6,085,180. For image data transfer, image data are stored in a portable device and are loaded in a controlled manner into a franking machine. The apparatus concerns only image data and is not connected to only one specific franking machine, i.e. the image data are not customer-specific.

A method and an arrangement for input of a printing stamp into a franking machine is known from the German Published Application DE 199 13 066 A1. In the franking machine of the type Jetmail® (manufacturer Francotyp Postalia GmbH), a preparation of a set of different country-specific and/or carrier-specific post stamp data ensues in a non-exchangeable memory of the franking machine in a first step and a configuration for a carrier and for a country in which the franking machine should be used ensues at the manufacturer in a second step. The configuration ensues by transmission of data by means of the integrated interface, in particular by means of a chip card via a chip card read/write unit of the franking machine. Data can be input into the franking machine in this manner. Either print images are transferred into the franking machine via an interface (for example chip card) or print images already present are selected for use. The data are not transferred from the franking machine to the chip card, and thus the chip card does not represent an updatable memory for print images.

An exchange of data without interconnected transfer means is known from the European Patent EP 560 714 B1 (corresponding to U.S. Pat. No. 5,509,117). To secure postal accounting data, a defective (old) installation unit is exchanged for a non-defective (new) installation unit, and the data of the old installation unit are transmitted to the new installation unit after both have been interconnected together via plug connectors. However, a data memory cannot be exchanged individually but rather only together with the installation unit.

A security module placed in a security region, the security module being plugged into the mainboard (motherboard) of the meter of the franking machine of the type JetMail® and that contains the accounting data, is known from the German design patent DE 200 20 635 U1. Other customer-dependent data (such as, for example, cliché and cost center data) are stored in a non-volatile manner in a separate memory of each franking machine. A franking machine of the type JetMail® has a meter assembly group and a base assembly group. The meter housing is fashioned as a security housing for protection of the mainboard. Since the battery-buffered memory units used in the meter still exhibit a DIP housing, they could be plugged into corresponding sockets on the mainboard and are therefore easily exchangeable in the case of repair. However, pluggable memory ICs (for example in a DIP housing) are problematic due to possible problems as to availability, lower capacity and limited expansion capability.

Such memories are no longer available with capacity sufficient for the subsequently developed franking machines. The exchange of defective mainboards is made more difficult by the transition from pluggable memory modules (DIP housing) to permanently soldered memory ICs in SOP, TSSOP or BGA housings since the customer-dependent data (for example cliché, cost centers) cannot be transferred from one mainboard to another without further measures. Although this transfer was still possible in the franking machine of the type JetMail® via a plugging of the battery-buffered memory, since memory in the DIP housing could still be used, for a franking machine of the type Ultimail software was created with whose help the data can be transferred from the franking machine into a service computer or personal computer (PC) via a serial data connection. The customer data thus can be changed in franking machines. If, for example, a defective mainboard of the franking machine must be exchanged for a new mainboard, the customer data are first transferred from the franking machine to a service computer via a serial data connection and then are copied from the service computer into the memory of the new mainboard after the mainboard exchange. However, this procedure cannot be applied in the case of a mainboard that is so defective that the data cannot be transferred from the service computer. In this case no data can be salvaged and an increased effort must be made in order to repair the franking machine.

Published German Utility Model DE 20 2006 008 952.7 discloses an arrangement for exchanging customer data of a franking device.

Customer-specific data such as a cliché, cost centers, postage tables, advertisements, selective printings, print settings and other settings are permanently stored in a franking machine. None of these types of data are security-relevant and thus are stored in flash or NVRAM, i.e. in a memory permanently connected with the franking machine.

When a mainboard is defective, there should be the possibility to reproduce the customer-specific data on a new mainboard. For this reason the customer-specific data are stored in a second medium.

Specific mechanisms are required in order to ensure that the data from the second storage medium can be reproduced in the permanently connected memory of the new mainboard.

SUMMARY OF THE INVENTION

An object of the present invention is to provide an arrangement for data processing and a method for operation of such an arrangement which does not exhibit, or exhibits to only a lesser degree, the disadvantages cited above, and in particular enables the transfer of user data from a defective mainboard to an intact mainboard with relatively little effort.

The present invention is based on the insight the transfer of user data from a defective mainboard to an intact mainboard is possible with relatively little effort when the user data are stored in a memory that is connected with the processor of the mainboard such that it can be simply detached. This memory is advantageously a commercially available pluggable memory (for example a commercially available memory card) with a predeterminable, defined data system, thus a predeterminable, defined formatting. Such a memory can be read out without further effort in a commercially available reader (for example a commercially available card reader).

This has the advantage that, even given extensive damage to the mainboard, to reconstruct the user data it must not be attempted to establish a connection to the memory via elaborate devices possibly to be manufactured specifically for this purpose. Rather, the memory can simply be read out via a commercially available reader with which the user data can then be simply reconstructed. Furthermore, if applicable it is possible to simply connect such a simply detachable memory with a repaired or exchanged mainboard (for example to plug the memory into the slot [plug-in receptacle] provided for this) and thus to simply reestablish the previous configuration of the arrangement with regard to the user data.

The present invention concerns an arrangement for data processing, in particular for a franking machine, with: a data processing device; a first memory permanently connected with the data processing device; and a security module connected with the data processing device for implementation of security-relevant services; whereby the data processing device is fashioned to store user data in the first memory, which user data can be predetermined by a user of the arrangement. On the one hand, a second memory connected with the data processing device such that it can be simply detached is provided, and the data processing device is on the other hand fashioned to store the user data in the second memory for data backup.

This design has the advantage that, in operation of the arrangement, the first memory can be used to quickly access the user data (for example in order to read or change these) while a backup copy of the user data can be generated via the second memory, which backup copy can be used to reconstruct the user data for a repaired or partially replaced arrangement in the event of damage to the second memory or the data processing device.

Depending on the security requirements to be placed on the arrangement, the second memory can be arranged in an area freely accessible by the user. However, it is advantageously provided that this is not the case, meaning that the second memory is accessible only be a correspondingly authorized person (for example a service technician or the like). A secure housing that is secured against undetected infiltration is provided and at least the second memory is arranged inaccessibly inside the secure housing in the closed state of the secure housing.

The data backup in the second memory can in principle ensue at arbitrary points in time. For example, it can thus be provided that the data backup ensues in more or less short, regular time intervals. However, the number of the data backup cycles per time unit is advantageously limited to a reasonable measure in order to ensure a sufficiently long lifespan of the second memory.

The data processing device is advantageously fashioned to detect the incidence of at least one predeterminable, chronological and/or non-chronological event to be detected and, upon incidence of the event, to effect an updating of the user data in the second memory using the user data in the first memory. The chronological events can be the arrival of a specific point in time (data and time), however also the expiration of a specific, predetermined time interval. The non-chronological events can, for example, be the incidence of a predeterminable condition, for example the execution of a predeterminable action (for example activation of the arrangement, deactivation of the arrangement, changing the operating state of the arrangement etc.), the execution of a predeterminable number of security-relevant services etc.

The data backup can ensue independently of whether a change of the user data has occurred since the last data backup. To reduce the write cycles and therewith to increase the lifespan of the second memory, the data backup advantageously ensues only when a change of the user data has also actually occurred since the last data backup. The data processing device is therefore advantageously fashioned to detect a change of the user data in the first memory since a preceding update of the user data in the second memory and, given the presence of a change of the user data in the first memory, to affect an update of the user data in the second memory. In order to achieve a further reduction of the write processes, it is advantageously provided that only one update with regard to the changed user data is affected. Thus only those data which have changed since the last data backup are then consequently detected and stored in the second memory.

In a preferred embodiment of the inventive arrangement, the data processing device is fashioned to detect a change of the configuration of the arrangement, in particular the exchange of the first memory, the second memory and the security module and, dependent on the detected change of the configuration of the arrangement, to effect an update of the user data in the first memory using the user data from the second memory or to effect an update of the user data in the second memory using the user data from the first memory.

Given an exchange of the first memory as occurs, for example, upon exchange of a defective mainboard, it is herewith possible in a simpler manner to reconstruct the previous state of the arrangement using the data from the second memory. Given an exchange of the second memory, which ensues, for example, given exchange of a defective memory card, it is likewise possible to implement a simple, new data backup of the user data.

Different authorization levels can possibly be provided within which the implementation of the described procedures is possible. For example, the described reconstruction of the user data may be effected only when a corresponding authorization exists, for example when the arrangement exists in a specific state into which it can only be brought by a correspondingly authorized person (for example a service technician) via input of corresponding information.

Furthermore, the described procedures can occur given the exchange of arbitrarily many components of the arrangement. However, for security reasons it is advantageous that this procedure is possible only for the exchange of a maximum number of components of the arrangement and/or specific components of the arrangement. This procedure may only be possible when at maximum one of the components has been exchanged in order to preclude the possibility of manipulations. Here again different authorization levels can be provided.

The data processing device is therefore preferably fashioned to block a further usage of the arrangement dependent on the detected change of the configuration of the arrangement, for example when it has been established that more than the predetermined maximum number of components has been exchanged and/or components different than the components allowed for exchange have been exchanged. The workflow protocol of the steps to be implemented in this case can be kept particularly simple so that these can be executed without large computational (and therewith temporal) effort. In particular, the further usage of the arrangement is blocked when it is established that, given identical second memory, the security module and the first memory have been exchanged or, given identical first memory, the security module and the second memory have been exchanged.

The establishment of the exchange of individual components of the arrangement can ensue in any suitable manner. For example, a central device can thus be present which registers and protocols corresponding changes. The exchange can simply be established in a preferred embodiment of the inventive arrangement in which at least one first identification is stored in the first memory; at least one second identification is stored in the second memory; a third identification is stored in the security module; and the data processing device is fashioned to compare the first identification, the second identification and the third identification with one another to detect the change of the configuration of the arrangement. For example, to establish an unchanged configuration it can thus be provided that the first through third identifications are identical, whereby the identical present identification can be an identification (for example a serial number) that is originally associated with only one of the components of the arrangement.

The data processing device is advantageously fashioned to effect the updating of the user data in the first memory using the user data from the second memory when the first identification is different from the third identification and the second identification corresponds to the third identification. Additionally or alternatively, the updating of the user data in the second memory can be effected using the user data from the first memory when the second identification is different from the third identification and the first identification corresponds to the third identification.

In order to provide an additional decision criterion, it can advantageously be provided that a fourth identification is stored in the first memory, a fifth identification is stored in the second memory and the data processing device is fashioned to effect the updating of the user data in the first memory or second memory when the fourth identification or the fifth identification is additionally different.

In principle any suitable memory of any suitable formatting can be used for the second memory, such that in principle any memory of this type can be used for the second memory. However, it is advantageously provided that a first authorization information is stored in the first memory, a second authorization information is stored in the second memory or the data processing device, and the data processing device is fashioned to compare the first authorization information and the second authorization information and to approve or to block a further usage of the arrangement dependent on the presence of a predeterminable relationship between the first authorization information and the second authorization information. For example, the authorization information can be corresponding information regarding formatting of the file system of the memory and/or an identifier, for example an identifier of the manufacturer of the arrangement. By the comparison of the authorization information it can be ensured that only correspondingly formatted memory can be used for the second memory, so the protocol for the communication with the second memory is significantly simplified.

The present invention can be particularly advantageously used in connection with franking devices, wherein normally a series of user data is to be administered. The arrangement is therefore advantageously fashioned as a component of a franking machine and the user data comprise cliché data for the generation of a franking imprint and/or comprise at least one postage table and/or data regarding mail classes (what are known as class of mail data) and/or at least one item of information that can be selected and/or defined by the user of the arrangement. For example, the information that can be selected and/or defined by the user can be data regarding cost centers, data regarding adjustment of the franking imprint, control data for the franking device (time duration until standby operation etc.), data regarding consumption (usage) limits, data regard speed dialing, regarding modem settings, etc.

In a preferred embodiment of the present invention the data processing device is furthermore fashioned to store diagnostic and/or statistical information in the second memory. It is herewith possible in an advantageous manner to gain correspondingly significant data regarding the state of the arrangement or its development over time for diagnosis purposes or statistical purposes.

The operation of the arrangement can be possible independent of the presence and/or the integrity of the second memory. However, the data processing device is advantageously fashioned to check the presence and/or the integrity of the second memory and, upon establishing the absence of the second memory or a damage to the second memory, to block a further usage of the arrangement at the latest upon incidence of a predeterminable temporal or non-temporal event.

As already mentioned, in principle a corresponding suitable memory type whose connection (for example a plug connection) with the data processing device is easy to release can be used for the second memory. The second memory is advantageously fashioned as a memory that can be written to serially, in particular as a type of SD or MMC card (multimedia card). It is understood that the second memory is a non-volatile memory while the first memory can possibly be fashioned as a volatile memory, however advantageously is likewise a non-volatile memory. The design of the first memory as a volatile memory thereby has the advantage of shorter access times to this memory, however entails the risk of a data loss (which, however, can in turn be acceptably low due to the backup copy in the second memory).

The present invention also concerns an arrangement for data processing, in particular for a franking machine, with a data processing device, a memory connected with the data processing device and a security module connected with the data processing device for implementation of security-relevant services, the data processing device being fashioned to store data predeterminable by a user in a memory. The memory is fashioned as a memory card connected with the data processing device such that it can be simply detached. The variants and advantages described above can also be realized to the same extent with this inventive arrangement, such that here reference is merely made to the above statements. Here it is also advantageous for the memory to be fashioned as a memory that can be written to serially, in particular as a type of SD or MMC card.

According to a further aspect the present invention concerns a method for operation of an arrangement for data processing, in particular for a franking machine, whereby the arrangement comprises a data processing device, a first memory permanently connected with the data processing device and a security module connected with the data processing device for implementation of security-relevant services, and user data predeterminable by a user of the arrangement are stored in the first memory. Furthermore, a second memory that is connected with the data processing device such that it can be simply detached is provided and the user data are stored in the second memory for data backup.

According to a further aspect, the present invention concerns a method for operation of an arrangement for data processing, in particular for a franking machine, whereby the arrangement comprises a data processing device, a memory connected with the data processing device and a security module connected with the data processing device for implementation of security-relevant services, and user data predeterminable by a user of the arrangement are stored in the memory. The memory is fashioned as a memory card connected with the data processing device such that it can be simply detached.

The embodiments and advantages described above can be realized to the same extent with the inventive method.

As mentioned above, the present invention can be used particularly advantageously in connection with franking devices, with a corresponding memory card (in the following, also designated as a customer or client card) is arranged such that it can be plugged into a socket as, for example, a backup medium for customer-specific data (user data, also designated in the following as customer data). The socket is connected with corresponding connections of a processor (thus the data processing device) of the franking device in order to serially transfer the customer data via the socket to the customer card and there to store said customer data in a non-volatile manner. For example, the transfer ensues with a high speed via a module for protection of the customer card from destruction by electrostatic discharge (ESD).

As mentioned, these customer data can be cost center data, advertisement cliché data, SMS text data, speed dial data, alternate printing statistical data, alternate printing cliché data, class of mail data or also postage table data etc.

The selection of a commercial memory card (such as, for example, a multimedia card (MMC)) as a second memory (consequently as a customer data memory) offers the following advantages. Very high costs relative to the costs in the development of an alternative module can thus be precluded. Furthermore, the handling relative to that given pluggable memory ICs (for example in a DIP housing) is unproblematical since ESD considerations can be attended to without further measures. Given a memory IC in a DIP housing a relatively complicated infrastructure for reading and writing would also be necessary. A new development of a necessary infrastructure for reading/writing outside of the franking machine is no longer necessary.

DESCRIPTION OF THE DRAWINGS

FIG. 3 is a block diagram of the electronics of an embodiment of a franking machine in accordance with the invention.

FIG. 4 illustrates stages of an exchange of the PSD and an MMC of a defective franking machine.

DESCRIPTION OF THE PREFERRED EMBODIMENTS

Figure 1:
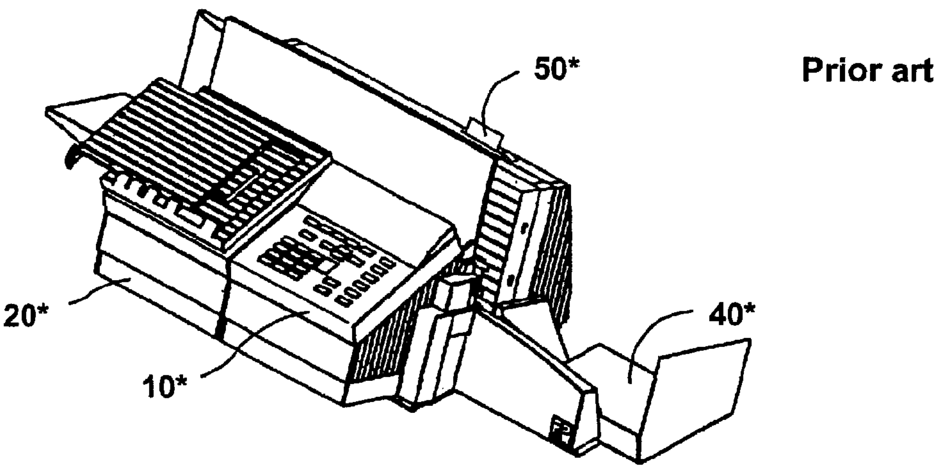
FIG. 1 is a perspective view of a known franking machine of the type Jetmail® from the front right top.

A perspective view of a known franking machine of the type Jetmail® from the front right top is shown in FIG. 1. In a basic version the franking machine JetMail® includes the assembly groups meter 10*, Base 20* and tray 40*. The meter 10* has on the top side a user interface with a display unit and a keypad. A security module and battery-buffered memory are plugged into the mainboard (not visible) within the meter, which has a security housing. The meter 10* is fashioned such that it can be removed from the base 20* and then is accessible from its floor, assuming a repair. If a defective meter 10* is removed, before it is scrapped, the battery-buffered memory and the security module are extracted and then plugged into the mainboard of a second (new) meter. The new meter is subsequently installed.

Figure 2:
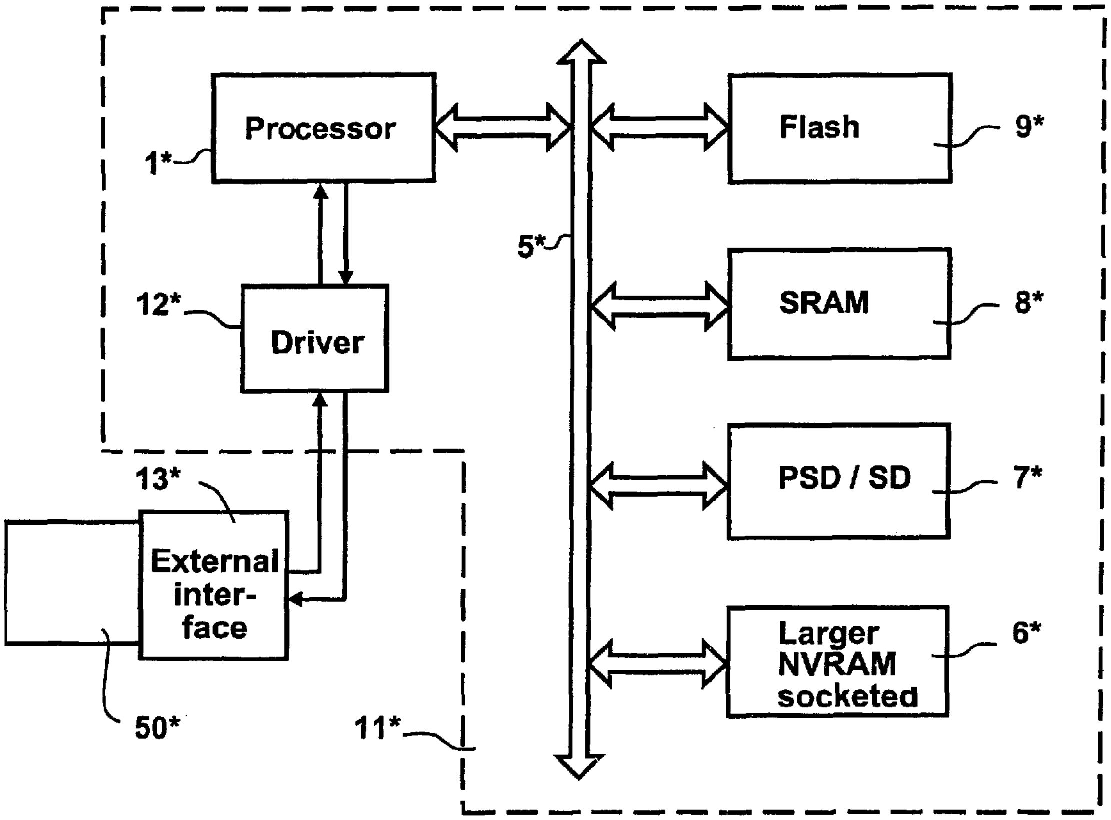
FIG. 2 is a block diagram of the electronics of the franking machine of the type Jetmail®.

A block diagram of the electronics of the franking machine of the type Jetmail® is shown in FIG. 2. A processor 1* on the mainboard 11* is connected (in terms of data, control and addressing) with an external interface 13* via a driver 12* and via a bus 5* with a socketed battery-buffered memory (NVRAM) 6*, with a postal security module (PSD) 7*, with a static RAM as a volatile working memory 8* and with a program memory (Flash) 9*. The NVRAM 6* serves for the storage of customer-specific data and therefore has a correspondingly large memory capacity. The PSD and the NVRAM 6* are plugged into respective corresponding sockets of the mainboard 11* of the meter 10*. The external interface 13* is a chip card read/write unit.

FIG. 3 shows a block diagram of the electronics of a franking machine in accordance with the invention corresponds with the basic design shown in FIG. 1 with the following differences. The integration of an MMC 4 into the electronics (assembly groups 1 through 9) of the mainboard 11 of a franking machine can be realized without a problem when modern processors 1 are used that already possess an MMC controller on-chip. The assembly group MMC socket 3 has a sufficient protection from destruction by electrostatic discharge (ESD) via a corresponding assembly group 2. Electromagnetic compatibility (EMV) and signal integrity factors can therewith be taken into account since the data transfer rate is up to 20 MHz. The data transfer rate is therewith more than an order of magnitude above that data transfer rate that is customary with chip cards.

Primarily the corresponding port pins of the processor 1 are connected with the MMC socket 3 via the ESD protection assembly group 2. Furthermore, via drivers 12 an interface 13 can optionally be enabled at the processor 1, for example a chip card read/write unit. The connections and the aforementioned optional assembly groups are marked with dash-dot lines.

The customer card MMC 4 is used as a backup medium for customer-specific data (cost center data, cliché data, optional print cliché data, class-of-mail data and postage table data as well as SMS-like short texts, abbreviated dialing and optional printing: statistics). In slower franking machines the processor is operated programmed by a first program stored in the program memory (flash) 9 such that altered data can be directly updated on the customer card MMC 4.

However, when the franking machine is a high-capacity franking system, all customer data cannot be immediately written to the customer card after each letter. The throughput of the franking machine would be reduced by the computing power required for this and the access times to the multimedia card 4, and the lifespan of the multimedia card 4, which is suitable only for a limited number of write cycles, would be substantially decreased. The processor 1 is connected (in terms of operation) with a non-volatile memory (NVRAM) 6 permanently soldered onto the mainboard 11, which non-volatile memory 6 exhibits a low storage capacity, and said processor 1 is operated programmed by a second program stored in the program memory (flash) 9 such that, for example, the currently set cost center is loaded into the NVRAM 6 before the current data are stored in this NVRAM 6. The data are updated on the customer card in time intervals, for example when a print pause is achieved or the machine was just activated or deactivated. The process is correspondingly programmed for this. This method is distinctly quicker since the current altered data are transferred in parallel from the bus 5 and are buffered in the non-volatile memory (NVRAM) 6 between the time intervals.

Stages of an exchange of the PSDs and an MMC of a defective franking machine are shown in FIG. 4. At a first point a first defective franking machine FM A is shown from which a PSD 7 and an MMC 4 (which are shown at a second point) are taken. The PSD 7 contains accounting/billing data and the MMC 4 contains the customer data. A second, non-defective franking machine FM B into which the extracted PSD 7 and MMC 4 were inserted is shown at a third point. It is understood that the franking machine FM B can be a wholly new franking machine, but it is also possible that it can be the old franking machine, in which the mainboard with the components affixed thereon has merely been replaced.

Figure 5:
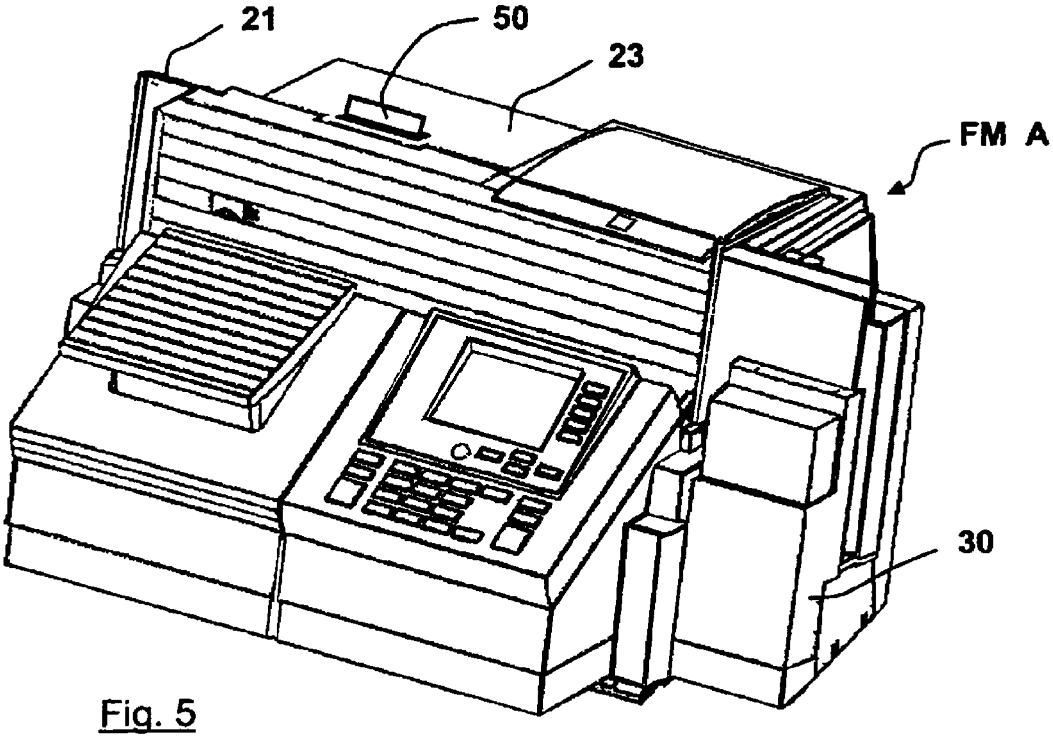
FIG. 5 is a perspective view of a franking machine in accordance with the present invention from the front right top.

FIG. 5 shows a perspective view of the inventive franking machine FM A from the front right above. In contrast to the franking machine of the type Jetmail®, no meter/base separation exists. The electronic components (likewise MMC and PSD) are arranged within the security housing of the new franking machine. After opening the security housing, the plugged assembly groups (customer card (MMC) and security module (PSD)) can be exchanged quickly.

An optional chip card 50 can be plugged into a chip card write/read unit that is arranged such that is accessible on the left half of the housing top 23 of the franking machine, behind a protective panel 21. The franking machine can be equipped with an automated power sealer 30 (shown) and further mail stations (not shown) such as, for example, with an automatic feeder in the periphery.

Figure 6:
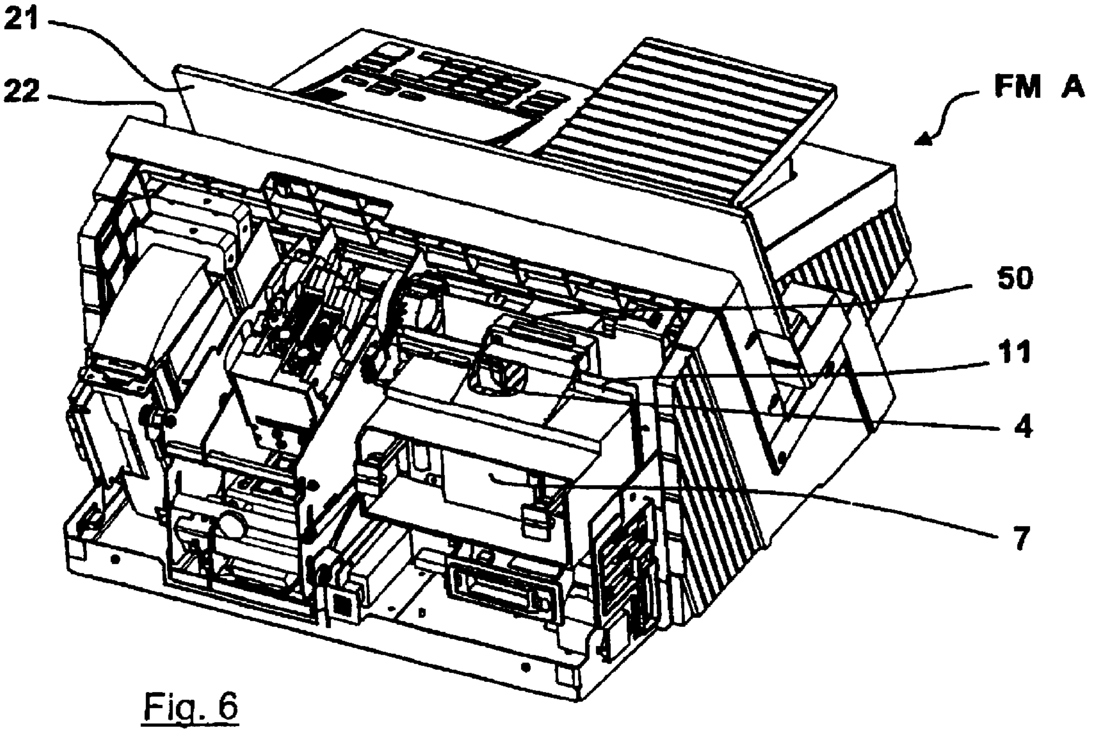
FIG. 6 is a rear view of the new franking machine of FIG. 5.

A rear view of the new franking machine FM A is shown in FIG. 6 from the rear, left, above, from which franking machine FM A the housing of the rear side has been removed. The components MMC 4 and PSD 7 are visible through this and through a section in a covering, which components are arranged near the rear wall of the new franking machine on the mainboard.

An envelope (not shown) or another mail piece standing on edge can be transported in a shaft that is bounded on its sides by the protective panel 21 and a guide plate 22. The printing of the mail piece with a franking stamp image ensues without contact by means of inkjet technology during the mail piece transport. The billing or accounting data are cryptographically secured with keys from the PSD.

The non-volatile memory 6 arranged on the mainboard 11 of the franking machine is, for example, a battery-buffered NVRAM. As an alternative to this, other non-volatile memory technologies (FRAM, NVSRAM) can also be used.

The MMC is operationally connected with the processor. Solutions are also conceivable in which a programmable logic (such as, for example, a Spartan-II 2.5V FPGA from the company XILINX or an application-specific integrated circuit (ASIC)) is connected in-between.

In a further embodiments of the invention, the customer data are also cryptographically secured with keys from the PSD. The encrypted customer data can additionally comprise an association of the customer data with the serial number of the PSD.

An MMC with customer data can also be plugged into a personal computer PC when the PC exhibits a corresponding interface. The security module which is designated for use in postal apparatuses can also exhibit a different design that enables it to be plugged into the mainboard of a personal computer, for example, to allow the personal computer to be operated as a PC franker and control a commercial printer.

Figure 7:
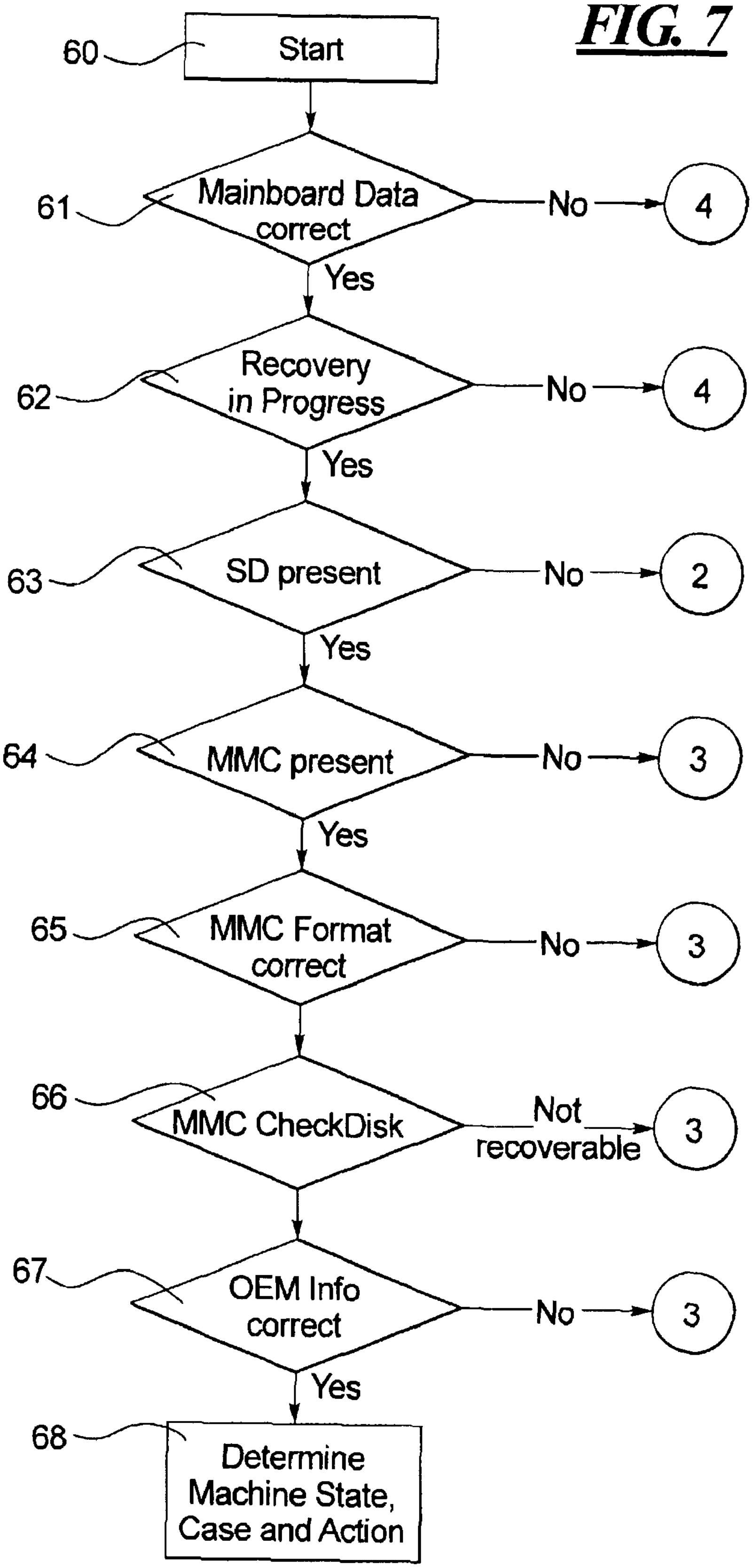
FIG. 7 is a flowchart showing steps in the method according to the present invention for determining the machine state of a franking device in which a MultiMedia Card is used for backing up customer data.

A procedure for backing up customer data stored in a franking machine, making use of an MMC in a card reader of the franking machine is shown in the flowchart of FIG. 7.

FIG. 7 illustrates a procedure that is executed before state determination, namely before the determination of the machine state. A number of checks is performed to ensure that the system is functioning properly. In FIG. 7, exit possibilities 2, 3 and 4 are indicated in circles. Exit case 2 is a startup into the service mode, exit case 3 represents an MMC defect, and exit case 4 is an emergency shutdown.

The portion of the procedure illustrated in F*igure* 7 starts in step 60 and checks, in step 61, whether the mainboard data are correct. If not, exit to the case 4 situation occurs. If the mainboard data are determined to be correct, a check is made in step 62 as to whether a recovery is in progress. If not, again an exit to case 4 is made. If so, a check is made in step 63 as to whether a security device is present. If not, the routine exits to case 2. If it is determined that a security device is present, a check is made in 64 as to whether the MMC is present. If not, the routine exits to case 3. If the MMC is present, a check is made in step 65 as to whether the MMC format is correct. If not, an exit to case 3 is made. If the MMC format is correct, an MMC checkdisk subroutine is executed, and if a "not recoverable" result occurs, and exit to case 3 is made. If the MMC checkdisk subroutine executes properly, a check is made in step 67 as to whether the OEM information is correct. If not, an exit to case 3 is made. If the OEM information is correct, then in step 68 the machine state is determined, as are the applicable case as well as any action that needs to be taken.

The method for operation of the franking machine is initially started in a step 101.1 of the method workflow of the method in that the franking machine is started. Via the processor 1 with access to a corresponding program in the program memory 9, it is then checked in a step 101.2 whether all expected components of the franking machine are present. Not only the presence is thereby checked but also a check ensues as to whether the respective components are intact and exhibit a predetermined state, for example a predetermined configuration.

In the step 101.2 it is checked whether the present multimedia card 4 comprises a first authorization information in the form of an identifier of the manufacturer of the franking machine which coincides with a second authorization information stored in the first memory (NVRAM 6) or the program memory 9. If this is not the case, a corresponding error message is output in a step 101.3 and a further operation of the franking machine is blocked. The same occurs upon establishment of the non-presence, a defect or a lacking authorization of a remaining component of the franking machine.

It is understood that in other embodiments of the invention the operation of the franking machine still be can be used for a specific number of frankings or for a specific time span before the block is effective given a missing, damaged or unauthorized multimedia card. A suitable warning message is then output to the user of the franking machine.

If all components are present, intact and, if applicable, appropriately authorized, using first through fifth identifications ID1 through ID5 it is subsequently checked in a configuration check whether a change of the configuration of the franking machine has occurred between the last deactivation of the franking machine and the new activation of the franking machine in the step 101.1

For this purpose, a first identification ID1 is stored in the first memory 6 in the form of the unique and singular serial number of the last security module 7 connected with the mainboard 11 and therewith the first memory 6. If the first memory 6 has not been previously connected with a security module, ID1=0 applies.

A second identification ID2 is stored in the second memory (thus the multimedia card 4) in the form of the unique and singular serial number of the last security module 7 connected with the second memory 4 via the mainboard 11. If the second memory 4 has not previously been connected with a security module, ID2=0 applies.

Among other things, the security module 7 has its singular and unique serial number stored as a third identification ID3, for which ID3≠0 always applies.

A fourth identification ID4 is additionally stored in the first memory 6 in the form of a hash value that is generated via a date and the unique and singular serial number of the last security module 7 connected with the mainboard 11 and therewith the first memory 6. If the first memory 6 has not previously been connected with a security module, ID4=0 applies.

Furthermore, a fifth identification ID5 is stored in the second memory 4 in the form of a hash value that is generated via a date and the unique and singular serial number of the last security module 7 connected with the second memory 4 via the mainboard 11. If the second memory 4 has not previously been connected with a security module, ID5=0 applies.

As is explained below in detail, for the case that the first memory 6 and the second memory 4 were last commonly connected with the mainboard 11 and therewith the same security module 7, it applies that the hash values of the fourth and fifth identifications are identical.

In a step 101.4 it is initially checked by the processor 1 whether a predetermined relationship exists between the first identification ID1 and the third identification ID3. In the present case, for this it is checked whether the first identification ID1 is identical to the third identification ID3.

If this is the case, it is established that the first memory 6 and the security module 7 were previously connected with one another and thus inasmuch no change of the configuration exists. In this case it is checked in a step 101.5 whether a predetermined relationship exists between the first identification ID1 and the second identification ID2. In the present example, for this it is checked whether the first identification ID1 is identical to the second identification ID2.

If this is the case, it is established that the first memory 6 and the second memory 4 were also previously connected with one another and therefore no change of the configuration of the franking machine has occurred. In this case the workflow jumps to an end point 101.6 of the configuration check.

If it is established in the step 101.5 that the first identification ID1 does not correspond to the second identification ID2, in a step 101.7 it is checked whether a predetermined relationship exists between the fourth identification ID4 and the third identification ID5. For this, in the present example it is checked whether the fourth identification ID4 is identical to the fifth identification ID5.

Figure 7A:
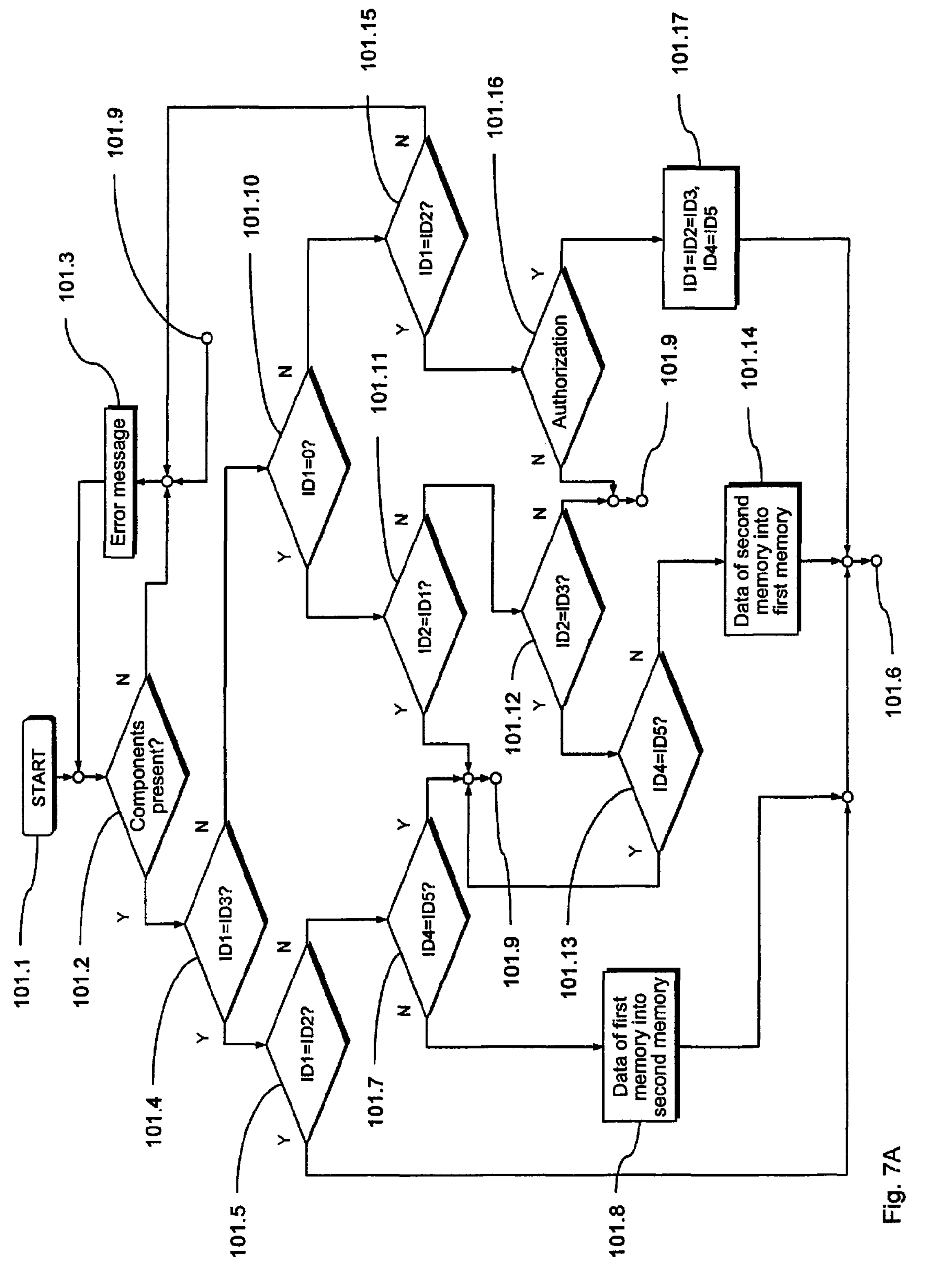
FIGS. 7A and 7B are a flow chart showing further details of the method in accordance with the present invention, that is implemented with the apparatus in accordance with the present invention.

If this is not the case, it is confirmed that the second memory 4 was exchanged. In this case the user data from the first memory 6 are written into the second memory 4 in a step 101.8 (consequently a first data securing is thus effected) and the workflow jumps back to the end point 101.6 of the configuration check. Otherwise an error exists and the workflow jumps back to the step 101.3 via the connection point 101.9 inserted into FIG. 7A for clarity.

If it is established in the step 101.4 that the first identification ID1 does not correspond to the third identification ID3, in a step 101.10 it is checked whether ID1=0 applies for the first identification, i.e. whether the mainboard 11 (and therewith the first memory 6) has been exchanged. If this is the case, in a step 101.11 it is checked whether a predetermined relationship exists between the first identification ID1 and the second identification ID2. For this purpose, in the present example it is checked whether the first identification ID1 is identical to the second identification ID2.

If this is the case (ID1=ID2=0), the workflow jumps (via the connection point 101.9) to the step 101.3 and a corresponding error message is output, since then both the first memory 6 and the second memory 4 have been exchanged, which is precluded for reasons of a simplification of the protocol.

If this is not the case (ID1≠ID2), in a step 101.12 it is checked whether a predetermined relationship exists between the second identification ID2 and the third identification ID3. For this purpose, in the present case it is checked whether the second identification ID2 is identical to the third identification ID3.

If this is not the case (ID2≠ID3), the workflow jumps (via the connection point 101.9) to the step 101.3 and a corresponding error message is output. Otherwise (ID2=ID3) it is checked in a step 101.13 whether a predetermined relationship exists between the fourth identification ID4 and the third identification ID5. For this purpose, in the present case it is checked whether the fourth identification ID4 is identical to the identification ID5.

If this is not the case (ID4≠ID5), it is confirmed that the first memory 6 was exchanged. In this case the user data from the second memory 4 are written into the first memory 6 in a step 101.14 (consequently a reconstruction of the user data on an exchanged main board 11 is thus effected) and the workflow jumps to the end point 101.6 of the configuration check. Otherwise (ID4=ID5) an error exists and the workflow jumps to the step 101.3 (via the connection point 101.9) and a corresponding error message is output.

Otherwise, if it is established in the step 101.10 that the first identification ID1 is not equal to zero, in a step 101.15 it is checked whether a predetermined relationship exists between the first identification ID1 and the second identification ID2. For this purpose, in the present example it is checked whether the first identification ID1 is identical to the second identification ID2.

If this is not the case (ID1≠ID2) it is established that more than one component was exchanged, which is precluded for reasons of the simplification of the protection. The workflow then jumps to the step 101.3 and a corresponding error message is output.

If it is otherwise established in the step 101.15 that the first identification ID1 is identical to the second identification ID2, it is established that the security module 7 was exchanged. In a step 101.16 it is henceforth checked whether the franking machine is in an authorized state, for example in which the processor 1 checks whether this state exists due to input of a corresponding authorization information by a service technician.

If this is not the case, the workflow jumps (via the connection point 101.9) to the step 101.3 and a corresponding error message is output. Otherwise in a step 101.17 the first identification ID1 and the second identification ID2 are set identical to the third identification ID3 of the new security module, i.e. the serial number of the new security module ID3 is written into the first memory 6 and the second memory 4. Furthermore, a new hash value is formed from the third identification ID3 and the current date, this new hash value being written as a new fourth identification ID4 into the first memory 6 and is written as a new fifth identification ID5 to the second memory 4. The workflow subsequently jumps to the end point 101.6 of the configuration check.

Figure 7B:
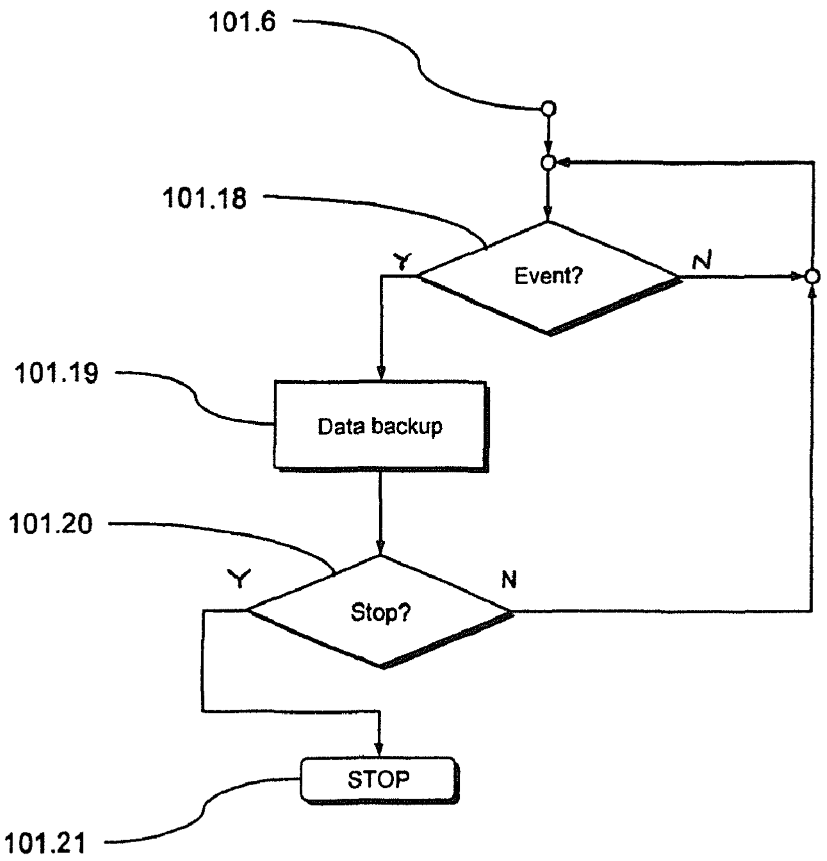

In the further operation of the franking machine it is then checked in a step 101.8 (see FIG. 7B) whether a predetermined result exists given whose arrival a new data backup of the user data from the first memory 6 into the second memory should ensue. If this is the case, corresponding data backup ensues in a step 101.9, whereby the processor 1 initially establishes which of the user data have been changed during the last data backup and then writes only the changed data from the first memory 6 into the second memory 4 for data backup.

In a step 101.20 it is then checked whether the method workflow should be ended. If this is not the case, the workflow jumps back to step 101.18. Otherwise the method workflow ends in a step 101.21.

Although modifications and changes may be suggested by those skilled in the art, it is the intention of the inventors to embody within the patent warranted hereon all changes and modifications as reasonably and properly come within the scope of their contribution to the art.

We claim as our invention:

1. An arrangement for data processing in a franking machine, comprising:

a secure housing that protects against unauthorized penetration into an interior of said secure housing;

a circuit board in said interior of said secure housing;

a data processor in said interior of said secure housing;

a security module inserted in said circuit board and connected to the data processor in said interior of said secure housing that implements security-relevant services associated with franking using security data;

a first memory entirely in said interior of said secure housing contained in a semiconductor package permanently mounted on said circuit board in order to be in permanent communication with the data processor and said data processor being configured to store user data a first time in said first memory, said user data being predetermined by a user and being different from said security data; and a second memory contained in a semiconductor package, separate from the semiconductor package in which said first memory is contained, entirely in said interior of said secure housing, said semiconductor package containing that contains said second memory being only temporarily mounted on a circuit board in order to be only in temporary communication with the data processor, said data processor being configured to store said user data in the second memory a second time as backup data for the user data stored in said first memory, with said user data being stored simultaneously in said first and second memories, said semiconductor package containing second memory being installed in said interior of said secure housing so as to be readily removable intact, with said backup data stored therein, from said interior of said security housing, upon authorized access to said interior of said security housing;

said first memory having a first identification ID1 stored therein consisting of a unique serial number of a last security module inserted on said circuit board and in communication with said first memory;

said second memory having a second identification ID2 stored therein consisting of a unique serial number of a last security module inserted on the circuit board and in communication with said second memory;

said security module having a third identification ID3 stored therein consisting of a unique serial number for said security module;

said first memory having a fourth identification ID4 stored therein consisting of a hash value generated from a date and said unique serial number of said last security module in communication with the first memory;

said second memory having a fifth identification ID5 stored therein consisting of a hash value generated from a date and said unique serial number of said last security module in communication with said second memory; and said data processor being configured to update data in said second memory by transferring data from said first memory into said second memory when ID1=ID3 and ID1≠ID2 and ID4≠ID5.

2. An arrangement as claimed in claim 1 wherein said data processor is configured to store first authorization information in the first memory and to store second authorization information in the second memory, and to compare the first authorization information with the second authorization information and to release or block further usage dependent on a result of a comparison indicating existence of a predetermined relationship between the first authorization information and the second authorization information.

3. An arrangement as claimed in claim 1 comprising a printing unit that prints franking indicia controlled by said data processor, and wherein said user data are data selected from the group consisting of cliché data for generating a franking imprint, at least one postage table, data identifying classes of mail, and data representing user-selectable information.

4. An arrangement as claimed in claim 1 wherein said data processor is configured to store additional data in said second memory selected from the group consisting of diagnostic data and statistical information.

5. An arrangement as claimed in claim 1 wherein said data processor is configured to execute a routine that checks at least one of presence of said second memory and integrity of said second memory and, upon determining at least one of an absence of the second memory or damage to the second memory, said processor being configured to block further usage at least until said data processor detects an occurrence of an event selected from the group consisting of predetermined temporal events and non-temporal events.

6. An arrangement as claimed in claim 1 wherein said second memory is a memory configured to allow serial writing therein, selected from the group consisting of a type of SD or an MMC card.

7. An arrangement as claimed in claim 1 wherein said data processor is operable to control a printer as a PC franker.

8. A method for data processing in a franking machine, comprising the steps of:

surrounding a data processor and a security module connected thereto with a secure housing that protects against unauthorized penetration into an interior of said secure housing, in which said security module and said data processor are contained;

with said security module connected to the data processor via a circuit board in said interior of said secure housing, implementing security-relevant services associated with franking using security data;

permanently connecting a semiconductor package containing a first memory entirely in said interior of said secure housing with the data processor by permanently mounting said semiconductor package on a circuit board and, from said data processor, storing user data a first time in said first memory, said user data being predetermined by a user and being different from said security data;

placing another semiconductor package, separate from the semiconductor package containing said first memory, containing a second memory in said interior of said secure housing only in temporary communication with the data processor by only temporarily mounting said another semiconductor package on a circuit board, and from said data processor, storing said user data in the second memory a second time as backup data for the user data stored in said first memory, with said user data being stored simultaneously in said first and second memories, and installing said semiconductor package that contains second memory in said interior of said secure housing so as to be readily removable intact, with said backup data stored therein, from said interior of said security housing, upon authorized access to said interior of said security housing;

in said first memory, storing a first identification ID1 consisting of a unique serial number of a last security module inserted on said circuit board and in communication with said first memory;

in said second memory, storing a second identification ID2 consisting of a unique serial number of a last security module inserted on the circuit board and in communication with said second memory;

in said security module, storing a third identification ID3 consisting of a unique serial number for said security module;

in said first memory, storing a fourth identification ID4 consisting of a hash value generated from a date and said unique serial number of said last security module in communication with the first memory;

in said second memory, storing a fifth identification ID5 consisting of a hash value generated from a date and said unique serial number of said last security module in communication with said second memory; and via said data processor, automatically updating data in said second memory by transferring data from said first memory into said second memory when ID1=ID3 and ID!≠ID2 and ID4≠ID5.

9. A method as claimed in claim 8 wherein said franking machine comprises a printing unit that prints franking indicia controlled by said data processor, and comprising selecting said user data from the group consisting of cliché data for generating a franking imprint, at least one postage table, data identifying classes of mail, and data representing user-selectable information.

10. A method as claimed in claim 8 comprising, via said data processor, storing additional data in said second memory selected from the group consisting of diagnostic data and statistical information.

11. A method as claimed in claim 8 comprising, in said data processor, executing a routine comprising checking at least one of presence of said second memory and integrity of said second memory and, upon determining at least one of an absence of the second memory or damage to the second memory, blocking further usage at least until said data processor detects an occurrence of an event selected from the group consisting of predetermined temporal events and non-temporal events.

12. A method as claimed in claim 8 comprising employing, as said second memory, a memory allowing serial writing therein, selected from the group consisting of a type of SD or an MMC card.

13. A method as claimed in claim 8 comprising operating said data processor to change said data in said second memory by directly communicating with said second memory.

* * * * *